(12) United States Patent
Fu

(10) Patent No.: US 11,513,510 B2
(45) Date of Patent: Nov. 29, 2022

(54) MOTOR VEHICLE SELF-DRIVING METHOD AND TERMINAL DEVICE

(71) Applicant: HUAWEI TECHNOLOGIES CO., LTD., Guangdong (CN)

(72) Inventor: Jiali Fu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 215 days.

(21) Appl. No.: 16/713,543

(22) Filed: Dec. 13, 2019

(65) Prior Publication Data

US 2020/0117185 A1 Apr. 16, 2020

Related U.S. Application Data

(63) Continuation of application No. PCT/CN2018/091299, filed on Jun. 14, 2018.

(30) Foreign Application Priority Data

Jun. 16, 2017 (CN) .......................... 201710459274.0

(51) Int. Cl.
  *G05D 1/00* (2006.01)
  *H04W 4/029* (2018.01)
  (Continued)

(52) U.S. Cl.
  CPC ......... *G05D 1/0016* (2013.01); *B60W 50/082* (2013.01); *G01S 5/009* (2013.01);
  (Continued)

(58) Field of Classification Search
  CPC .. G05D 1/0016; G05D 1/0223; G05D 1/0272; G05D 1/0276; H04W 4/029;
  (Continued)

(56) References Cited

U.S. PATENT DOCUMENTS

2014/0297090 A1  10/2014  Ichinose
2015/0146605 A1*  5/2015  Rubin ................. G08G 1/09
                                                    370/312
(Continued)

FOREIGN PATENT DOCUMENTS

CN  104575079 A  *  4/2015  ............. G08G 1/144
CN  105936294 A     9/2016
(Continued)

OTHER PUBLICATIONS

English Translation of Foreign Reference "CN-104575079-A".*

*Primary Examiner* — Rami Khatib
*Assistant Examiner* — Shahira Baajour
(74) *Attorney, Agent, or Firm* — Womble Bond Dickinson (US) LLP

(57) ABSTRACT

Embodiments of this application describe a motor vehicle self-driving method and a terminal device. The method may include obtaining, by a terminal device, vehicle external-environment data of a position of a motor vehicle and initial positioning precision of the motor vehicle. The method may also include determining, by the terminal device, a target driving parameter of the motor vehicle based on the vehicle external-environment data and the initial positioning precision. Furthermore, the method may include controlling, by the terminal device, the motor vehicle to drive based on the target driving parameter. In the embodiments of this application, the terminal device determines the target driving parameter of the motor vehicle based on the vehicle external-environment data and the initial positioning precision. In this way, the target driving parameter varies with the vehicle external-environment data, and further matches an external environment, thereby improving self-driving safety of the motor vehicle.

12 Claims, 4 Drawing Sheets

(51) Int. Cl.
 *B60W 50/08* (2020.01)
 *G01S 5/00* (2006.01)
 *G05D 1/02* (2020.01)

(52) U.S. Cl.
 CPC ......... *G05D 1/0022* (2013.01); *G05D 1/0061* (2013.01); *G05D 1/0223* (2013.01); *G05D 1/0272* (2013.01); *H04W 4/029* (2018.02); *B60W 2556/50* (2020.02)

(58) Field of Classification Search
 CPC .. H04W 4/44; B60W 50/082; B60W 2556/50; G01S 5/009
 See application file for complete search history.

(56) References Cited

U.S. PATENT DOCUMENTS

| | | | |
|---|---|---|---|
| 2016/0259335 A1 | 9/2016 | Oyama | |
| 2016/0327948 A1* | 11/2016 | Taguchi | ............... G05D 1/0251 |
| 2018/0038689 A1 | 2/2018 | Takemura et al. | |

FOREIGN PATENT DOCUMENTS

| | | |
|---|---|---|
| CN | 106840177 A | 6/2017 |
| CN | 107333245 A | 11/2017 |
| JP | 2012144068 A | 8/2012 |
| WO | 2016129403 A1 | 8/2016 |

\* cited by examiner

MOTOR VEHICLE SELF-DRIVING METHOD AND TERMINAL DEVICE

CROSS-REFERENCE TO RELATED APPLICATIONS

This application is a continuation of International Application No. PCT/CN2018/091299, filed on Jun. 14, 2018, which claims priority to Chinese Patent Application No. 201710459274.0, filed on Jun. 16, 2017. The disclosures of the aforementioned applications are hereby incorporated by reference in their entireties.

TECHNICAL FIELD

This application relates to the field of self-driving technologies, and in particular, to a motor vehicle self-driving method and a terminal device.

BACKGROUND

A self-driving technology relies on cooperation of artificial intelligence, visual computing, radar, a monitoring apparatus, and a global positioning system, so that a motor vehicle can implement self-driving without an active manual operation. Because the self-driving technology does not require a human to drive the motor vehicle, a human driving failure can be effectively avoided in theory, a traffic accident can be reduced, and road transportation efficiency can be improved. Therefore, the self-driving technology attracts increasing attention.

Currently, in a related technology, under the guidance of a detailed map, the motor vehicle determines a driving parameter of the motor vehicle based on a positioning mode to implement self-driving of the motor vehicle.

In a process of implementing this application, the inventor finds that in the related technology, a driving parameter of the motor vehicle during self-driving is related to only a positioning mode. Correspondingly, in a process of locating the motor vehicle in various positioning modes, positioning precision is greatly affected by an external environment. When the external environment changes, actual positioning precision of a same positioning mode changes accordingly. The driving parameter in the related technology does not change due to the change of the external environment, and consequently the actual positioning precision of the motor vehicle does not match the driving parameter, and driving safety of the motor vehicle cannot be ensured. In addition, even if the actual positioning precision is not affected by the change of the external environment, driving safety of the motor vehicle cannot be ensured when a same driving parameter is used in different external environments (for example, in different road conditions such as an asphalt road and a dirt road).

SUMMARY

Embodiments of this application provide a motor vehicle self-driving method and a terminal device, to improve self-driving safety of a motor vehicle.

According to a first aspect, an embodiment of this application provides a motor vehicle self-driving method, including: obtaining, by a terminal device, environment data of a position of a motor vehicle and initial positioning precision of the motor vehicle; determining, by the terminal device, a target driving parameter of the motor vehicle based on the vehicle external-environment data and the initial positioning precision; and controlling, by the terminal device, the motor vehicle to drive based on the target driving parameter.

According to the motor vehicle self-driving method provided in this embodiment of this application, the terminal device obtains the vehicle external-environment data of the position of the motor vehicle and the initial positioning precision of the motor vehicle; the terminal device determines the target driving parameter of the motor vehicle based on the vehicle external-environment data and the initial positioning precision; and the terminal device controls the motor vehicle to drive based on the target driving parameter.

In this embodiment of this application, the terminal device determines the target driving parameter of the motor vehicle based on the vehicle external-environment data and the initial positioning precision. In this way, the target driving parameter varies with the vehicle external-environment data, and further matches an external environment, thereby improving self-driving safety of the motor vehicle.

Optionally, in an embodiment of this application, the obtaining, by a terminal device, vehicle external-environment data of a position of a motor vehicle and initial positioning precision of the motor vehicle includes: obtaining, by the terminal device, a positioning mode of the motor vehicle; determining, by the terminal device, the initial positioning precision based on the positioning mode; and obtaining, by the terminal device, the vehicle external-environment data obtained through detection by an environment monitoring apparatus.

In this optional embodiment, the terminal device determines the initial positioning precision based on the obtained positioning mode, and then obtains the vehicle external-environment data obtained through detection by the environment monitoring apparatus, thereby obtaining the vehicle external-environment data and the initial positioning precision of the motor vehicle.

Optionally, in an embodiment of this application, the obtaining, by a terminal device, vehicle external-environment data of a position of a motor vehicle and initial positioning precision of the motor vehicle includes: obtaining, by the terminal device, the initial positioning precision of the motor vehicle prestored in the terminal device; and obtaining, by the terminal device, the vehicle external-environment data obtained through detection by an environment monitoring apparatus.

In this optional embodiment, the terminal device may directly obtain the initial positioning precision of the motor vehicle prestored in the terminal device. In other words, the terminal device obtains the initial positioning precision of the motor vehicle without a need to obtain a positioning mode of the motor vehicle, thereby improving efficiency of obtaining the vehicle external-environment data and the initial positioning precision of the motor vehicle by the terminal device.

Optionally, in an embodiment of this application, the determining, by the terminal device, a target driving parameter of the motor vehicle based on the vehicle external-environment data and the initial positioning precision includes: determining, by the terminal device, actual positioning precision of the motor vehicle based on the vehicle external-environment data and the initial positioning precision; and determining, by the terminal device, the target driving parameter of the motor vehicle based on the actual positioning precision.

In this optional embodiment, the terminal device first determines the actual positioning precision of the motor vehicle based on the vehicle external-environment data and the initial positioning precision, and the actual positioning precision is real positioning precision of the motor vehicle. Therefore, the target driving parameter determined by the terminal device based on the actual positioning precision can ensure self-driving safety of the motor vehicle.

Optionally, in an embodiment of this application, the determining, by the terminal device, actual positioning precision of the motor vehicle based on the vehicle external-environment data and the initial positioning precision includes: determining, by the terminal device, whether the vehicle external-environment data includes a preset environment characteristic; and when the vehicle external-environment data includes the preset environment characteristic, determining, by the terminal device, the actual positioning precision based on the preset environment characteristic and the initial positioning precision; or when the vehicle external-environment data does not include the preset environment characteristic, using, by the terminal device, the initial positioning precision as the actual positioning precision.

In this optional embodiment, when the vehicle external-environment data includes the preset environment characteristic, the actual positioning precision is determined based on the preset environment characteristic and the initial positioning precision, or when the vehicle external-environment data does not include the preset environment characteristic, the initial positioning precision is directly used as the actual positioning precision. In other words, the initial positioning precision is adjusted only when the vehicle external-environment data includes the preset environment characteristic, thereby avoiding a case in which the initial positioning precision is adjusted once an environment changes.

Optionally, in an embodiment of this application, the determining, by the terminal device, actual positioning precision of the motor vehicle based on the vehicle external-environment data and the initial positioning precision includes: determining, by the terminal device, the actual positioning precision based on the vehicle external-environment data and the initial positioning precision, and a function relationship between the actual positioning precision and both the vehicle external-environment data and the initial positioning precision.

Optionally, in an embodiment of this application, the determining, by the terminal device, the actual positioning precision based on the preset environment characteristic and the initial positioning precision includes: determining, by the terminal device, a precision offset based on the preset environment characteristic; and adding, by the terminal device, the precision offset and the initial positioning precision to obtain the actual positioning precision.

In this optional embodiment, the terminal device determines the precision offset based on the preset environment characteristic, and then adds the precision offset and the initial positioning precision to obtain the actual positioning precision of the motor vehicle.

Optionally, in an embodiment of this application, the method further includes: determining, by the terminal device, whether the actual positioning precision meets self-driving positioning precision; and when the actual positioning precision meets the self-driving positioning precision, determining, by the terminal device, the target driving parameter of the motor vehicle based on the actual positioning precision; or when the actual positioning precision does not meet the self-driving positioning precision, prompting, by the terminal device, a driver to manually drive the motor vehicle.

In this optional embodiment, when the actual positioning precision does not meet the self-driving positioning precision, the terminal device prompts the driver to manually drive the motor vehicle, so that driving safety of the motor vehicle can be further improved.

Optionally, an embodiment of this application, the determining, by the terminal device, a target driving parameter of the motor vehicle based on the vehicle external-environment data and the initial positioning precision includes: determining, by the terminal device, a theoretical driving parameter of the motor vehicle based on the initial positioning precision; determining, by the terminal device, a driving parameter offset based on the vehicle external-environment data; and calculating, by the terminal device, the target driving parameter based on the theoretical driving parameter and the driving parameter offset.

In this optional embodiment, the terminal device first determines the theoretical driving parameter of the motor vehicle based on the initial positioning precision, and then determines the driving parameter offset based on the vehicle external-environment data. Finally, the terminal device calculates the target driving parameter based on the theoretical driving parameter and the driving parameter offset. In this specific implementation, impact of the vehicle external-environment data on the theoretical driving parameter is considered. Therefore, the target driving parameter finally determined by the terminal device can ensure self-driving safety of the motor vehicle.

Optionally, in an embodiment of this application, the controlling, by the terminal device, the motor vehicle to drive based on the target driving parameter includes: obtaining, by the terminal device, a current driving parameter of the motor vehicle; determining, by the terminal device, whether the current driving parameter is the same as the target driving parameter; and when the current driving parameter is different from the target driving parameter, adjusting, by the terminal device, the current driving parameter to the target driving parameter.

In this optional embodiment, when the current driving parameter is different from the target driving parameter, the terminal device adjusts the current driving parameter to the target driving parameter, to improve driving safety of the motor vehicle.

Optionally, in an embodiment of this application, the target driving parameter includes a vehicle speed, a vehicle distance, and/or a vehicle width.

According to a second aspect, an embodiment of this application provides a terminal device, including: an obtaining module, configured to obtain vehicle external-environment data of a position of a motor vehicle and initial positioning precision of the motor vehicle; and a processing module, configured to: determine a target driving parameter of the motor vehicle based on the vehicle external-environment data and the initial positioning precision, and control the motor vehicle to drive based on the target driving parameter.

According to the terminal device provided in this embodiment of this application, the obtaining module obtains the vehicle external-environment data of the position of the motor vehicle and the initial positioning precision of the motor vehicle; and the processing module determines the target driving parameter of the motor vehicle based on the vehicle external-environment data and the initial positioning precision, and controls the motor vehicle to drive based on the target driving parameter.

In this embodiment of this application, the terminal device determines the target driving parameter of the motor vehicle based on the vehicle external-environment data and the initial positioning precision. In this way, the target driving parameter varies with the vehicle external-environment data, and further matches an external environment, thereby improving self-driving safety of the motor vehicle.

Optionally, in an embodiment of this application, the obtaining module is specifically configured to: obtain a positioning mode of the motor vehicle; determine the initial positioning precision based on the positioning mode; and obtain the vehicle external-environment data obtained through detection by an environment monitoring apparatus.

Optionally, in an embodiment of this application, the obtaining module is specifically configured to: obtain the initial positioning precision of the motor vehicle prestored in the terminal device; and obtain the vehicle external-environment data obtained through detection by an environment monitoring apparatus.

Optionally, in an embodiment of this application, the processing module is specifically configured to: determine actual positioning precision of the motor vehicle based on the vehicle external-environment data and the initial positioning precision; and determine the target driving parameter of the motor vehicle based on the actual positioning precision.

Optionally, in an embodiment of this application, the processing module is specifically configured to: determine whether the vehicle external-environment data includes a preset environment characteristic; and when the vehicle external-environment data includes the preset environment characteristic, determine the actual positioning precision based on the preset environment characteristic and the initial positioning precision; or when the vehicle external-environment data does not include the preset environment characteristic, use the initial positioning precision as the actual positioning precision.

Optionally, in an embodiment of this application, the processing module is specifically configured to determine the actual positioning precision based on the vehicle external-environment data and the initial positioning precision, and a function relationship between the actual positioning precision and both the vehicle external-environment data and the initial positioning precision.

Optionally, in an embodiment of this application, the processing module is specifically configured to: determine a precision offset based on the preset environment characteristic; and add the precision offset and the initial positioning precision to obtain the actual positioning precision.

Optionally, in an embodiment of this application, the processing module is further configured to: determine whether the actual positioning precision meets self-driving positioning precision; and when the actual positioning precision meets the self-driving positioning precision, determine the target driving parameter of the motor vehicle based on the actual positioning precision; or when the actual positioning precision does not meet the self-driving positioning precision, prompt a driver to manually drive the motor vehicle.

Optionally, in an embodiment of this application, the processing module is specifically configured to: determine a theoretical driving parameter of the motor vehicle based on the initial positioning precision; determine a driving parameter offset based on the vehicle external-environment data; and calculate the target driving parameter based on the theoretical driving parameter and the driving parameter offset.

Optionally, in an embodiment of this application, the processing module is specifically configured to: obtain a current driving parameter of the motor vehicle; determine whether the current driving parameter is the same as the target driving parameter; and when the current driving parameter is different from the target driving parameter, adjust the current driving parameter to the target driving parameter.

Optionally, in an embodiment of this application, the target driving parameter includes a vehicle speed, a vehicle distance, and/or a vehicle width.

According to a third aspect, an embodiment of this application provides a computer storage medium. The computer storage medium may store a program, and when the program is executed, the motor vehicle self-driving method in any one of the embodiments of the first aspect of this application may be implemented.

BRIEF DESCRIPTION OF DRAWINGS

To describe the technical solutions in the embodiments of this application more clearly, the following briefly describes the accompanying drawings required for describing the embodiments. Apparently, a person of ordinary skill in the art may derive other drawings from these accompanying drawings without creative efforts.

DESCRIPTION OF EMBODIMENTS

Figure 1:
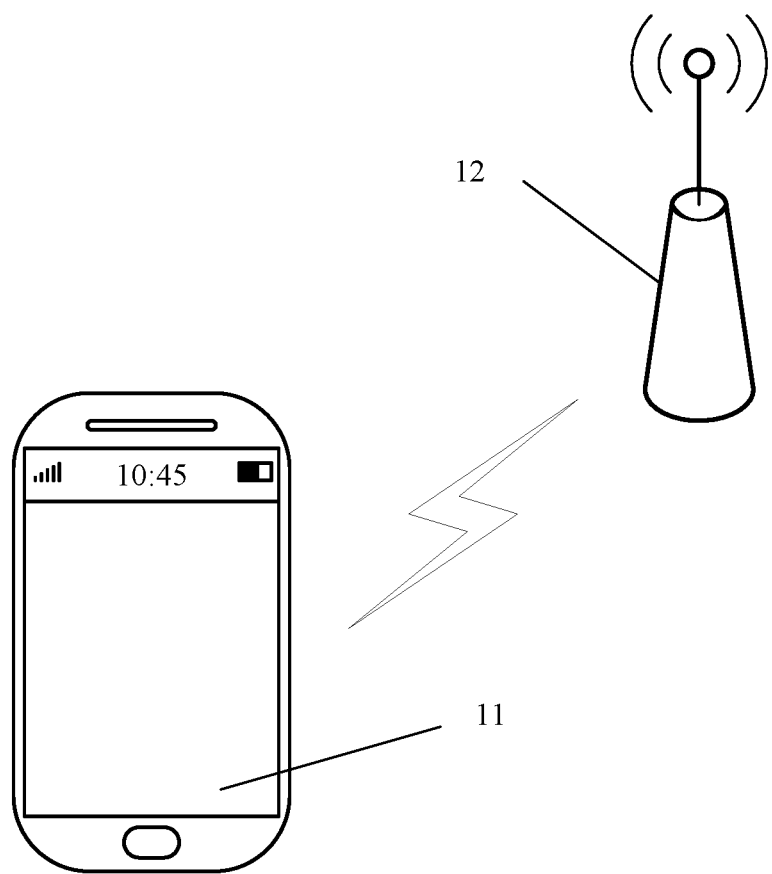
FIG. 1 is a diagram of an application scenario according to an embodiment of this application.

In the following, an application scenario of the embodiments of this application is described with reference to the accompanying drawing. FIG. 1 is a schematic diagram of an application scenario according to an embodiment of this application. The application scenario includes a terminal device 11 and a network device 12.

In embodiments of this application, the terminal device 11 may be a device that provides a user with voice and/or data connectivity, a handheld device with a wireless connection function, or another processing device connected to a wireless modem. The terminal device 11 may communicate with one or more core networks through a radio access network (RAN). The terminal device 11 may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. The terminal device 11 may be, for example, a personal communications service (PCS) phone, a cordless phone, a session initiation protocol (SIP) phone set, a wireless local loop (WLL) station, or a personal digital assistant (PDA). The terminal device 11 may also be referred to as a system, a subscriber unit (SU), a subscriber station (SS), a mobile station (MS), a remote station (RS), an access point (AP), a remote terminal (RT), an access terminal (AT), a user terminal (UT), a user agent (UA), a user device, or user equipment (UE). The network device 12 is a device that provides a positioning service for the terminal device 11. For example, the network device 12 may be a base station, an enhanced base station, a relay with a scheduling function, or a device with a base station function, or the network device 12 may be a satellite, or the network device may include a base station and a satellite. The base station may be an evolved NodeB (eNB) in a long term evolution (LTE) system, or a base station in another system. This is not limited in the embodiments of this application. The satellite may be a satellite in a beidou navigation satellite system (BDS), a satellite in a global positioning system (GPS), or a satellite in a global navigation satellite system (GLONASS). This is not limited in the embodiments of this application. It should be specifically noted that in actual application, there are a plurality of network devices 12. For example, when a positioning function is provided for the terminal device 11 by using a satellite, there are at least four network devices 12, or when a positioning function is provided for the terminal device 11 by using a base station, there are at least three network devices 12.

In the application scenario shown in FIG. 1, the embodiments of this application provide a motor vehicle driving method and a terminal device, to improve self-driving safety of a motor vehicle.

In the embodiments of this application, the terminal device 11 first obtains vehicle external-environment data of a position of a motor vehicle and initial positioning precision of the motor vehicle, and then the terminal device 11 determines a target driving parameter of the motor vehicle based on the obtained vehicle external-environment data and the obtained initial positioning precision. Based on this, the terminal device 11 controls the motor vehicle to drive based on the target driving parameter.

In the embodiments of this application, the terminal device 11 determines the target driving parameter of the motor vehicle based on the vehicle external-environment data and the initial positioning precision. In this way, the target driving parameter varies with the vehicle external-environment data, and further matches an external environment, thereby improving self-driving safety of the motor vehicle. The terminal device 11 is located on a motor vehicle whose driving is controlled by the terminal device 11. In actual application, for example, the terminal device may be embedded in the motor vehicle, or may be connected to the motor vehicle through a communications interface. In a self-driving process of the motor vehicle, the terminal device 11 provides a positioning function for the motor vehicle by using the network device 12.

Figure 2:
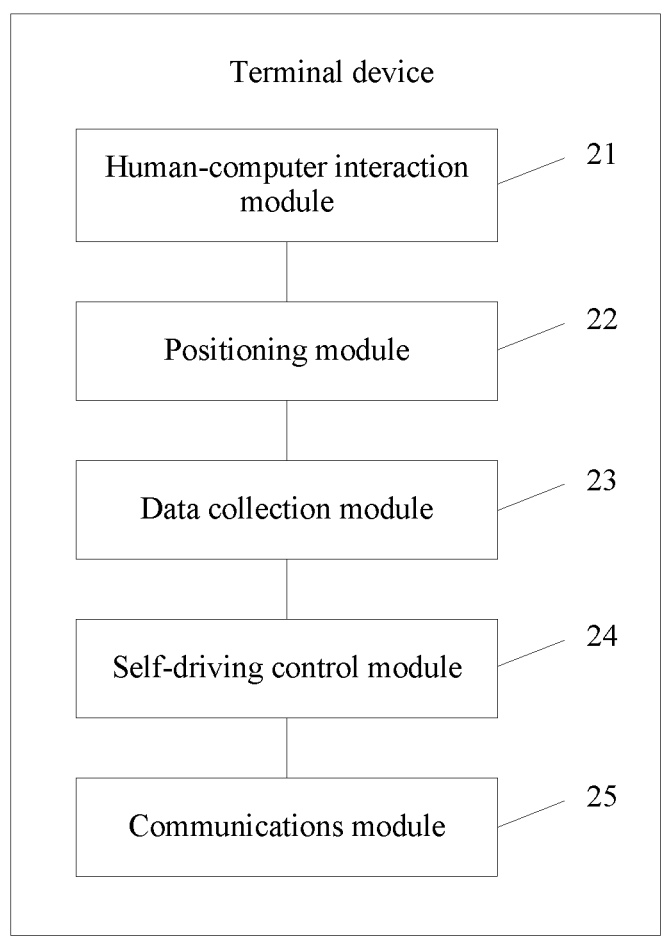
FIG. 2 is a diagram of an internal module of a terminal device according to an embodiment of this application.

Before specific operation steps of the terminal device 11 in the embodiments of this application are described, internal modules of the terminal device 11 are first described. FIG. 2 is a diagram of an internal module of a terminal device according to an embodiment of this application. In FIG. 2, the terminal device may include a human-computer interaction module 21, a positioning module 22, a data collection module 23, a self-driving control module 24, and a communications module 25.

The human-computer interaction module 21 is configured to: present driving information and status information of a motor vehicle (such as a vehicle speed and a current temperature in the vehicle) to a user, and also provide the user with a function of entering some common instructions, for example, allowing the user to modify a journey or a destination or switch to a manual driving mode. In embodiments of this application, the human-computer interaction module 21 may be represented in a plurality of manners. For example, the human-computer interaction module may perform human-computer interaction by using a graphical user interface (GUI), or may perform human-computer interaction through voice recognition.

The positioning module 21 is configured to: receive and demodulate a signal of a satellite or a base station to locate a current position of the motor vehicle, and identify a positioning mode and a parameter that may be used or have been used by the terminal device 11.

The data collection module 23 is configured to: in a driving process of the motor vehicle, monitor driving information of the motor vehicle and ambient environment data, such as a vehicle speed, a vehicle distance, an obstacle, and weather.

The self-driving control module 24 is configured to: control driving based on a positioning mode and data that is fed back by the positioning module 21 and the data collecting module 23, and parse obtained information into a vehicle control system instruction, to control the motor vehicle.

The communications module 25 is configured to perform networking and communication with the network device 12. Especially, after the motor vehicle enters a self-driving mode, the communications module 25 is configured to provide real-time communication between modules, to finally implement self-driving of the motor vehicle.

The following separately describes the operation steps of the terminal device 11 in the application scenario shown in FIG. 1 by using a specific embodiment.

Figure 3:
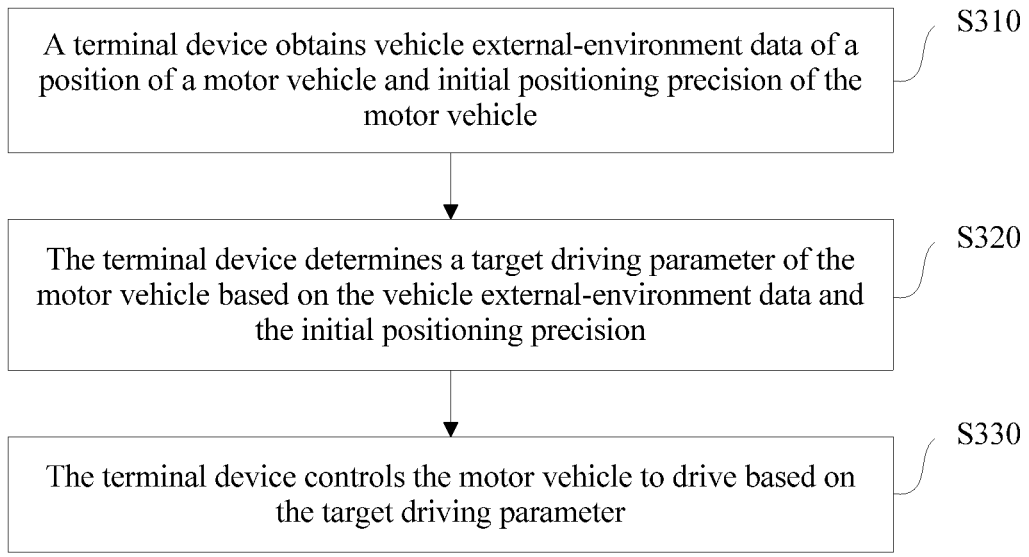
FIG. 3 is a schematic flowchart of a motor vehicle self-driving method according to an embodiment of this application.

FIG. 3 is a schematic flowchart of a motor vehicle self-driving method according to an embodiment of this application. This embodiment may include the following steps.

In step S310, the terminal device 11 obtains environment data of a position of a motor vehicle and initial positioning precision of the motor vehicle.

The vehicle external-environment data in this embodiment of this application may be one or more of weather, a temperature, or a geographical position. The weather and the geographical position information herein may be obtained through detection by a camera, and the temperature information may be obtained through detection by a temperature sensor. The initial positioning precision in this embodiment of this application may be represented by a precision value, or may be represented by a precision level. Specific precision is related to a positioning mode. For example, when the positioning mode is GPS+base station, the initial positioning precision is 10 m, or when the positioning mode is a GPS, the initial positioning precision is 50 m. For another example, when the positioning mode is GPS+base station, the initial positioning precision is a level 1, when the positioning mode is a GPS, the initial positioning precision is a level 2, or when the positioning mode is a base station, the initial positioning precision is a level 3. It should be noted that in this embodiment of this application, higher initial positioning precision indicates a lower level of the initial positioning precision.

In embodiments of this application, step S310 may be implemented in a plurality of manners. For example, in an embodiment of this application, step S310 may include:

the terminal device 11 obtains a positioning mode of the motor vehicle;

the terminal device 11 determines the initial positioning precision based on the positioning mode; and the terminal device 11 obtains the vehicle external-environment data obtained through detection by an environment monitoring apparatus.

In this embodiment, the terminal device 11 may use a positioning mode of a positioning module disposed on the terminal device 11 as a positioning mode of the motor vehicle. Alternatively, the motor vehicle carries a positioning module, and then the terminal device 11 obtains a positioning mode of the motor vehicle through interaction with the positioning module carried by the motor vehicle. There may be a plurality of obtained vehicle positioning modes, for example, GPS+base station, GPS outdoor positioning, and base station positioning. The initial positioning precision may be represented by a precision value, or may be represented by a precision level. Specific precision is related to a positioning mode. In this embodiment of this application, the environment monitoring apparatus may be located on the terminal device 11, or the environment monitoring apparatus may be independent of the terminal device 11 but is located on the motor vehicle, and then the terminal device 11 interacts with the environment monitoring apparatus to obtain the vehicle external-environment data.

For another example, in another embodiment of this application, step S310 may include:

the terminal device 11 obtains the initial positioning precision of the motor vehicle prestored in the terminal device 11; and the terminal device 11 obtains the vehicle external-environment data obtained through detection by an environment monitoring apparatus.

In this embodiment, the initial positioning precision is prestored in the motor vehicle, and the terminal device may directly obtain the initial positioning precision. Therefore, a latency in obtaining the initial positioning precision by the terminal device 11 can be reduced.

In step S320, the terminal device 11 determines a target driving parameter of the motor vehicle based on the vehicle external-environment data and the initial positioning precision.

In an embodiment of this application, the target driving parameter herein may include a vehicle speed, a vehicle distance, and/or a vehicle width.

In an embodiment of this application, step S320 may be implemented in a plurality of manners. For example, in a specific implementation of this embodiment of this application, step S320 may include:

the terminal device 11 calculates the target driving parameter of the motor vehicle based on the vehicle external-environment data and the initial positioning precision.

Specifically, the target driving parameter may be a function that uses the vehicle external-environment data and the initial positioning precision as independent variables. After the terminal device 11 learns of the vehicle external-environment data and the initial positioning precision, the terminal device 11 may directly determine the target driving parameter based on a function relationship between the target driving parameter and both the vehicle external-environment data and the initial positioning precision.

For another example, in another embodiment of this application, step S320 may include:

the terminal device 11 determines a theoretical driving parameter of the motor vehicle based on the initial positioning precision;

the terminal device 11 determines a driving parameter offset based on the vehicle external-environment data; and the terminal device 11 calculates the target driving parameter based on the theoretical driving parameter and the driving parameter offset.

For example, if the initial positioning precision is 10 m, the theoretical driving parameter determined by the terminal device 11 based on the initial positioning precision is 50 km/h. If the vehicle external-environment data is light rain, the driving parameter offset determined by the terminal device 11 based on the vehicle external-environment data is −10 km/h. In this case, the target driving parameter calculated by the terminal device 11 based on the theoretical driving parameter and the driving parameter offset is 40 km/h.

For another example, in an embodiment of this application, step S320 may include:

the terminal device 11 determines actual positioning precision of the motor vehicle based on the vehicle external-environment data and the initial positioning precision; and the terminal device 11 determines the target driving parameter of the motor vehicle based on the actual positioning precision.

The actual positioning precision is real positioning precision of the motor vehicle.

Optionally, in an embodiment of this application, that the terminal device 11 determines actual positioning precision of the motor vehicle based on the vehicle external-environment data and the initial positioning precision includes:

the terminal device 11 determines the actual positioning precision based on the vehicle external-environment data and the initial positioning precision, and a function relationship between the actual positioning precision and both the vehicle external-environment data and the initial positioning precision.

Optionally, in an embodiment of this application, that the terminal device 11 determines actual positioning precision of the motor vehicle based on the vehicle external-environment data and the initial positioning precision includes:

the terminal device 11 determines whether the vehicle external-environment data includes a preset environment characteristic; and when the vehicle external-environment data includes the preset environment characteristic, the terminal device 11 determines the actual positioning precision based on the preset environment characteristic and the initial positioning precision; or when the vehicle external-environment data does not include the preset environment characteristic, the terminal device 11 uses the initial positioning precision as the actual positioning precision.

For example, it is assumed that the preset environment characteristic is snow, rain, a typhoon, a high temperature (above 38° C.), an extremely low temperature (below −10° C.), a tall building, a remote mountainous area, or a tunnel. When the vehicle external-environment data includes one or more of these preset environment characteristics, in a specific implementation of this embodiment of this application, a theoretical positioning precision level corresponding to the initial positioning precision may be predefined, and a correspondence between the preset environment characteristic and a positioning precision level adjustment magnitude is defined. When determining the actual positioning precision based on the preset environment characteristic and the initial positioning precision, the terminal device 11 may obtain the positioning precision level adjustment magnitude based on the correspondence between the preset environment characteristic and the positioning precision level adjustment magnitude. For example, if the predefined theoretical positioning precision level is a level 1, when an external environment is a high temperature, an extremely low temperature, a high building, rain, or a typhoon, positioning precision is reduced by one level; or when an external environment is a remote mountainous area, a tunnel, or snow, positioning precision is reduced by two levels. When the vehicle external-environment data includes at least two preset environment characteristics, the terminal device 11 may obtain a positioning precision level adjustment magnitude by using one preset environment characteristic that has greatest impact, or may accumulate a positioning precision level adjustment magnitude obtained for each preset environment characteristic.

In another embodiment of this application, a function relationship between the actual positioning precision and both the initial positioning precision and the preset environment characteristic may be alternatively predefined, and then the terminal device 11 determines the actual positioning precision based on the function relationship between the actual positioning precision and both the initial positioning precision and the preset environment characteristic. For example, the function relationship between the actual positioning precision and both the initial positioning precision and the preset environment characteristic is as follows:

$$\text{Precision}' = \text{Precision} \times (1 + a \times \Delta\text{Weather} + b \times \Delta\text{Location})$$

Precision represents initial positioning precision corresponding to a current positioning mode, for example, 50 m; ΔWeather represents weather data, and a method for obtaining a value of ΔWeather may be, for example, the value is 0 on a sunny day, the value is 1 on a rainy day, the value is 1 on a high temperature day, the value is 1 on an extremely low temperature day, or the value is 2 on a snowy day; ΔLocation represents geographic position data, and a method for obtaining a value of ΔLocation may be, for example, the value is 0 in an open area of a city center, the value is 1 in a tall building, or the value is 2 in a remote mountainous area or a tunnel; Precision' represents the actual positioning precision, and when positioning precision is not adjusted, the parameter Precision' may not exist or may be equal to a value of Precision; a and b are weight values, for example, the weight value may be 1 by default, or the weight value may be adjusted based on severity affected by a corresponding factor, or may be set by a user.

Optionally, in an embodiment of this application, that the terminal device 11 determines the actual positioning precision of the motor vehicle based on the preset environment characteristic and the initial positioning precision includes:

the terminal device 11 determines a precision offset based on the preset environment characteristic; and the terminal device 11 adds the precision offset and the initial positioning precision to obtain the actual positioning precision.

For example, if the initial positioning precision is 10 m, and the vehicle external-environment data is light rain, the precision offset determined by the terminal device 11 based on the vehicle external-environment data is 5 m. In this case, the actual positioning precision finally obtained by the terminal device 11 is 15 m.

In an embodiment of this application, the terminal device 11 may determine the target driving parameter of the motor vehicle based on the actual positioning precision in a plurality of implementations. For example, when positioning precision is represented by a level, a correspondence between a precision level and a driving parameter may be predefined. When learning of the actual positioning precision, the terminal device 11 may obtain the target driving parameter based on the correspondence between a precision level and a driving parameter. Certainly, the terminal device 11 may determine the target driving parameter in another manner. For example, when the target driving parameter includes a vehicle speed and a vehicle distance, the target driving parameter may be obtained by using the following predefined function relationship:

$$\text{Speed}' = \text{Speed} \times (1 - c \times (\text{Precision}' - \text{Precision})/\text{Precision});$$

$$\text{Distance}' = \text{Distance} \times (1 - d \times (\text{Precision}' - \text{Precision})/\text{Precision}).$$

Speed is a vehicle speed corresponding to the initial positioning precision, for example, 50 km/h; Speed' is a vehicle speed corresponding to the target driving parameter; Distance is a vehicle distance corresponding to the initial positioning precision, for example, 20 m; Speed' is a vehicle distance corresponding to the target driving parameter; c and d are weight values, and the weight value is 1 by default, or may be another default value, or may be determined by a user, or may be adaptively adjusted based on a road condition or an environment.

It should be noted herein that in the foregoing embodiment, when obtaining the target driving parameter, the terminal device 11 considers only the actual positioning precision. In a self-driving process of the motor vehicle, impact of both a current vehicle distance and a current vehicle speed on the target driving parameter may be considered. The actual positioning precision is not adjusted even when a road condition deteriorates or the like. However, because the vehicle external-environment data obtained by the terminal device 11 indicates that a current environment deteriorates, the terminal device 11 may adjust a driving parameter. For example, if a road is potholed, the terminal device 11 may reduce a vehicle speed by 10 km/h to obtain the target driving parameter.

In step S330, the terminal device 11 controls the motor vehicle to drive based on the target driving parameter.

an embodiment of this application, step S330 may include:

the terminal device 11 obtains a current driving parameter of the motor vehicle;

the terminal device 11 determines whether the current driving parameter is the same as the target driving parameter; and when the current driving parameter is different from the target driving parameter, the terminal device 11 adjusts the current driving parameter to the target driving parameter.

In actual application, for example, in a process in which the terminal device 11 adjusts the current driving parameter to the target driving parameter, to ensure smooth driving of the motor vehicle, the terminal device 11 may smoothly adjust the current driving parameter to the target driving parameter.

According to the motor vehicle self-driving method provided in this embodiment of this application, the terminal device obtains the vehicle external-environment data of the position of the motor vehicle and the initial positioning precision of the motor vehicle; the terminal device determines the target driving parameter of the motor vehicle based on the vehicle external-environment data and the initial positioning precision; and the terminal device controls the motor vehicle to drive based on the target driving parameter.

In this embodiment of this application, the terminal device determines the target driving parameter of the motor vehicle based on the vehicle external-environment data and the initial positioning precision. In this way, the target driving parameter varies with the vehicle external-environment data, and further matches an external environment, thereby improving self-driving safety of the motor vehicle.

In addition, in actual application, for example, because an external environment is quite tough, the actual positioning precision of the motor vehicle may be quite low and even positioning cannot be implemented. In this case, if the motor vehicle still uses a self-driving mode, safety of the motor vehicle cannot be ensured. In view of the above, in a specific implementation of this embodiment of this application, the embodiment in FIG. 3 may further include:

the terminal device 11 determines whether the actual positioning precision meets self-driving positioning precision; and when the actual positioning precision meets the self-driving positioning precision, the terminal device 11 determines the target driving parameter of the motor vehicle based on the actual positioning precision; or when the actual positioning precision does not meet the self-driving positioning precision, the terminal device 11 prompts a driver to manually drive the motor vehicle.

Corresponding to the foregoing method embodiment, an embodiment of this application further provides an embodiment of a corresponding terminal device.

Figure 4:
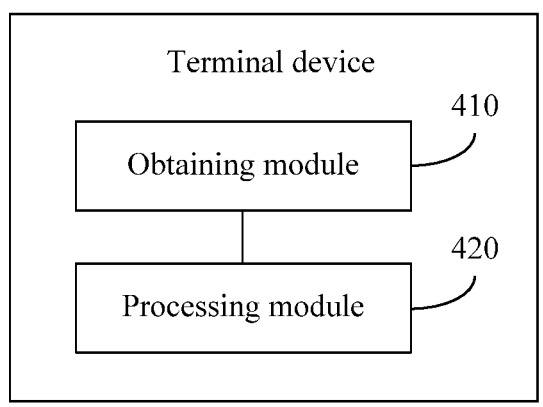
FIG. 4 is a schematic structural diagram of a terminal device according to an embodiment of this application.

FIG. 4 is a schematic structural diagram of a terminal device according to an embodiment of this application. The terminal device is configured to perform the motor vehicle self-driving method shown in FIG. 3. The terminal device may include an obtaining module 410 and a processing module 420.

The obtaining module 410 is configured to obtain vehicle external-environment data of a position of a motor vehicle and initial positioning precision of the motor vehicle.

The processing module 420 is configured to: determine a target driving parameter of the motor vehicle based on the vehicle external-environment data and the initial positioning precision; and control the motor vehicle to drive based on the target driving parameter.

According to the terminal device provided in this embodiment of this application, the obtaining module obtains the vehicle external-environment data of the position of the motor vehicle and the initial positioning precision of the motor vehicle; and the processing module determines the target driving parameter of the motor vehicle based on the vehicle external-environment data and the initial positioning precision, and controls the motor vehicle to drive based on the target driving parameter.

In this embodiment of this application, the terminal device determines the target driving parameter of the motor vehicle based on the vehicle external-environment data and the initial positioning precision. In this way, the target driving parameter varies with the vehicle external-environment data, and further matches an external environment, thereby improving self-driving safety of the motor vehicle.

Optionally, in an embodiment of this application, the obtaining module 410 is specifically configured to: obtain a positioning mode of the motor vehicle; determine the initial positioning precision based on the positioning mode; and obtain the vehicle external-environment data obtained through detection by an environment monitoring apparatus.

Optionally, in an embodiment of this application, the obtaining module 410 is specifically configured to: obtain the initial positioning precision of the motor vehicle pre-stored in the terminal device; and obtain the vehicle external-environment data obtained through detection by an environment monitoring apparatus.

Optionally, in an embodiment of this application, the processing module 420 is specifically configured to: determine actual positioning precision of the motor vehicle based on the vehicle external-environment data and the initial positioning precision; and determine the target driving parameter of the motor vehicle based on the actual positioning precision.

Optionally, in an embodiment of this application, the processing module 420 is specifically configured to: determine whether the vehicle external-environment data includes a preset environment characteristic; and when the vehicle external-environment data includes the preset environment characteristic, determine the actual positioning precision based on the preset environment characteristic and the initial positioning precision; or when the vehicle external-nal-environment data does not include the preset environment characteristic, use the initial positioning precision as the actual positioning precision.

Optionally, in an embodiment of this application, the processing module 420 is specifically configured to determine the actual positioning precision based on the vehicle external-environment data and the initial positioning precision, and a function relationship between the actual positioning precision and both the vehicle external-environment data and the initial positioning precision.

Optionally, in an embodiment of this application, the processing module 420 is specifically configured to: determine a precision offset based on the preset environment characteristic; and add the precision offset and the initial positioning precision to obtain the actual positioning precision.

Optionally, in an embodiment of this application, the processing module 420 is further configured to: determine whether the actual positioning precision meets self-driving positioning precision; and when the actual positioning precision meets the self-driving positioning precision, determine the target driving parameter of the motor vehicle based on the actual positioning precision; or when the actual positioning precision does not meet the self-driving positioning precision, prompt a driver to manually drive the motor vehicle.

Optionally, in an embodiment of this application, the processing module 420 is specifically configured to: determine a theoretical driving parameter of the motor vehicle based on the initial positioning precision; determine a driving parameter offset based on the vehicle external-environment data; and calculate the target driving parameter based on the theoretical driving parameter and the driving parameter offset.

Optionally, in an embodiment of this application, the processing module 420 is specifically configured to: obtain a current driving parameter of the motor vehicle; determine whether the current driving parameter is the same as the target driving parameter; and when the current driving parameter is different from the target driving parameter, adjust the current driving parameter to the target driving parameter.

Optionally, in an embodiment of this application, the target driving parameter includes a vehicle speed, a vehicle distance, and/or a vehicle width.

Figure 5:
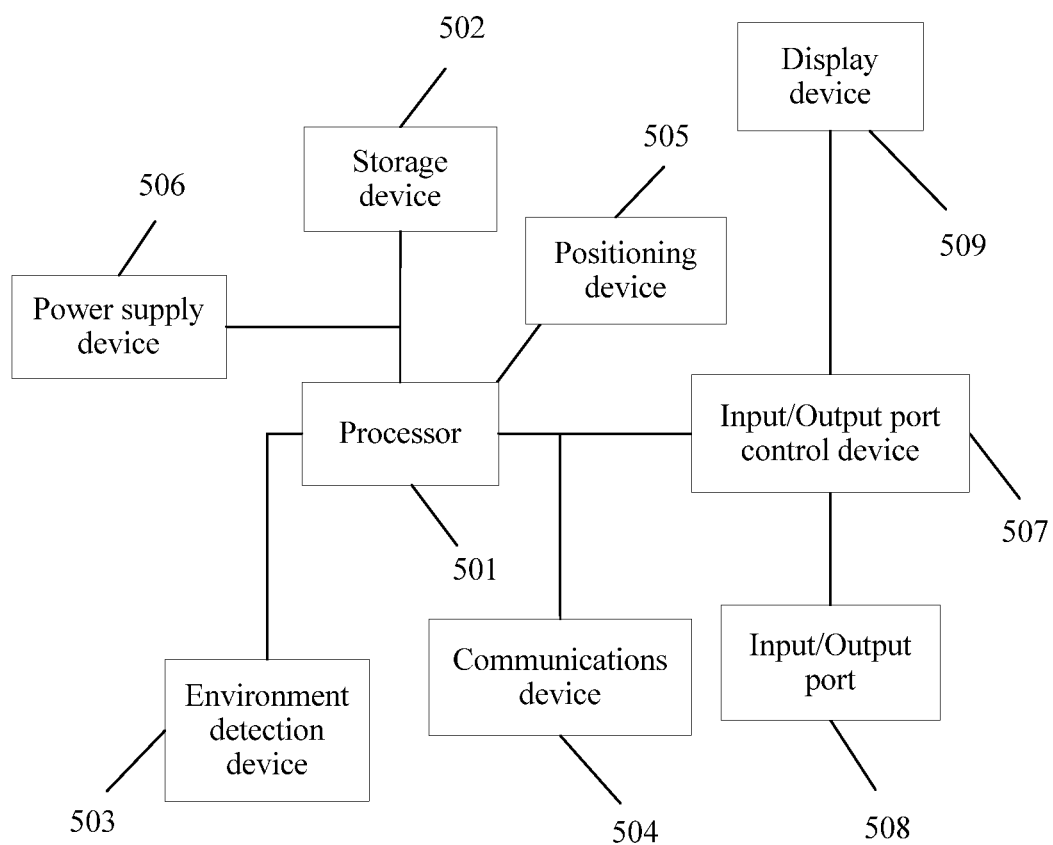
FIG. 5 is a structural diagram of hardware of a terminal device according to an embodiment of this application.

FIG. 5 is a schematic structural diagram of a terminal device according to an embodiment of this application. The terminal device may be a terminal device in any one of the foregoing embodiments, and is configured to implement steps of the method in the foregoing embodiment.

As shown in FIG. 5, the terminal device may include components such as a processor 501, a storage device 502, an environment detection device 503, a communications device 504, a positioning device 505, a power supply device 506, an input/output control device 507, an input/output port 508, and a display device 509. The terminal device may further include more or fewer components, or combine some components, or have different component arrangements. This is not limited in this embodiment of this application.

The processor 501 is configured to control each part of hardware device of the entire terminal device, and run operating system software and required application program software. The processor 501 may include an integrated circuit (IC), for example, may include a single packaged IC, or may include a plurality of connected packaged ICs with a same function or different functions. For example, the processor 501 may include only a central processing unit (CPU), or may be a combination of a GPU, a digital signal processor DSP), and a control chip (for example, a baseband chip) in a transceiver module. In various implementations of this application, the CPU may be a single computing core, or may include a plurality of computing cores.

The storage device 502 is configured to: store various software programs and data of the terminal device, run software, and the like, and may be specifically one or more of a random access memory (RAM), an erasable programmable read-only memory (EPROM), a solid-state drive (SSD), an secure digital memory (SD) card, and a hard disk (HD).

The environment detection device 503 is configured to determine a road traffic environment and collect data, and may be specifically various sensors such as a short-range communications module, a GPS receiver, an infrared sensor, radar, and a camera.

The communications device 504 is configured to provide a network communication function for the terminal device, and may be specifically a device that performs communication by using a communications technology such as a local area network, second generation (2G), third generation (3G), or fourth generation (4G).

The positioning device 505 is configured to provide a positioning function for the terminal device, and may be specifically a device that can implement the positioning function such as a GPS receiver.

The power supply device 506 is configured to provide power support for the terminal device.

The input/output port control device 507 is configured to control data interaction between various input/output devices in the terminal device.

The input/output port 508 is an external interface provided by the terminal device, and includes one or more of a universal serial bus (USB) interface, an SD card interface, a compact disk (CD)/digital video disk (DVD) interface, a key interface, and the like.

The display device 509 is a GUI operation/display panel provided by the terminal device, and is configured to display an operating status of a motor vehicle, a device status, an environment of the motor vehicle, a user operation interface, and an operation result. The display device 509 may be alternatively a touchscreen that is configured to receive a user touch operation and convert the user touch operation into a user operation instruction.

In specific implementation, an embodiment of this application further provides a computer storage medium. The computer storage medium may store a program, and when the program is executed, some or all of the steps in the embodiments of the motor vehicle self-driving method provided in the embodiments of this application may be performed. The storage medium may be a magnetic disk, an optical disc, a read-only memory (ROM), a RAM, or the like.

A person skilled in the art may clearly understand that, the technologies in the embodiments of this application may be implemented by software in addition to a necessary general hardware platform. Based on such an understanding, the technical solutions in the embodiments of this application essentially or the part contributing to the prior art may be implemented in a form of a software product. The computer software product may be stored in a storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments of this application.

The embodiments in this specification are all described in a progressive manner, for same or similar parts in the embodiments, reference may be made to these embodiments, and each embodiment focuses on a difference from other embodiments. Especially, system and apparatus embodiments are basically similar to a method embodiment, and therefore are described briefly. For related parts, refer to partial description in the method embodiment.

The foregoing descriptions are implementations of this application, but are not intended to limit the protection scope of this application. Any modification, equivalent replacement, and improvement made without departing from the spirit and principle of this application shall fall within the protection scope of this application.

What is claimed is:

1. A motor vehicle self-driving method, comprising:
   obtaining, by a terminal device, vehicle external-environment data of a position of a motor vehicle and initial positioning precision of the motor vehicle;
   determining, by the terminal device, a target driving parameter of the motor vehicle based on the vehicle external-environment data and the initial positioning precision, comprising:
      determining actual positioning precision of the motor vehicle based on the vehicle external-environment data and the initial positioning precision comprising:
         determining whether the vehicle external-environment data comprises a preset environment characteristic, and
         when the vehicle external-environment data comprises the preset environment characteristic, determining a precision offset based on the preset environment characteristic, and adding the precision offset and the initial positioning precision to obtain the actual positioning precision; or when the vehicle external-environment data does not comprise the preset environment characteristic, using the initial positioning precision as the actual positioning precision, and
      determining the target driving parameter of the motor vehicle based on the actual positioning precision; and
   controlling, by the terminal device, the motor vehicle to drive based on the target driving parameter.

2. The method according to claim 1, wherein the obtaining, by the terminal device, the vehicle external-environment data of the position of the motor vehicle and the initial positioning precision of the motor vehicle comprises:
   obtaining, by the terminal device, a positioning mode of the motor vehicle;
   determining, by the terminal device, the initial positioning precision based on the positioning mode; and
   obtaining, by the terminal device, the vehicle external-environment data detected by an environment monitoring apparatus.

3. The method according to claim 1, further comprising:
   determining, by the terminal device, whether the actual positioning precision meets self-driving positioning precision; and when the actual positioning precision meets the self-driving positioning precision, determining, by the terminal device, the target driving parameter of the motor vehicle based on the actual positioning precision; or when the actual positioning precision does not meet the self-driving positioning precision, prompting, by the terminal device, a driver to manually drive the motor vehicle.

4. The method according to claim 1, wherein the determining, by the terminal device, the target driving parameter of the motor vehicle based on the vehicle external-environment data and the initial positioning precision comprises:
determining, by the terminal device, a theoretical driving parameter of the motor vehicle based on the initial positioning precision;
determining, by the terminal device, a driving parameter offset based on the vehicle external-environment data; and
calculating, by the terminal device, the target driving parameter based on the theoretical driving parameter and the driving parameter offset.

5. The method according to any claim 1, wherein the controlling, by the terminal device, the motor vehicle to drive based on the target driving parameter comprises:
obtaining, by the terminal device, a current driving parameter of the motor vehicle;
determining, by the terminal device, whether the current driving parameter is the same as the target driving parameter; and
when the current driving parameter is different from the target driving parameter, adjusting, by the terminal device, the current driving parameter to the target driving parameter.

6. A terminal device, comprising:
a memory; and
a processor, communicably coupled with the memory, configured to:
obtain vehicle external-environment data of a position of a motor vehicle and initial positioning precision of the motor vehicle, and
determine a target driving parameter of the motor vehicle based on the vehicle external-environment data and the initial positioning precision, further comprising the processor configured to:
determine actual positioning precision of the motor vehicle based on the vehicle external-environment data and the initial positioning precision by:
determining whether the vehicle external-environment data comprises a preset environment characteristic, and
when the vehicle external-environment data comprises the preset environment characteristic, determining a precision offset based on the preset environment characteristic, and adding the precision offset and the initial positioning precision to obtain the actual positioning precision; or when the vehicle external-environment data does not comprise the preset environment characteristic, using the initial positioning precision as the actual positioning precision, and
determine the target driving parameter of the motor vehicle based on the actual positioning precision; and
control the motor vehicle to drive based on the target driving parameter.

7. The terminal device according to claim 6, wherein the processor configured to obtain the vehicle external-environment data of the position of the motor vehicle and the initial positioning precision of the motor vehicle further comprises the processor configured to:
obtain a positioning mode of the motor vehicle;
determine the initial positioning precision based on the positioning mode; and
obtain the vehicle external-environment data obtained through detection by an environment monitoring apparatus.

8. The terminal device according to 6, wherein the processor is further configured to:
determine whether the actual positioning precision meets self-driving positioning precision; and
when the actual positioning precision meets the self-driving positioning precision, determine the target driving parameter of the motor vehicle based on the actual positioning precision; or
when the actual positioning precision does not meet the self-driving positioning precision, prompt a driver to manually drive the motor vehicle.

9. The terminal device according to claim 6, wherein the processor is further configured to:
determine a theoretical driving parameter of the motor vehicle based on the initial positioning precision;
determine a driving parameter offset based on the vehicle external-environment data; and
calculate the target driving parameter based on the theoretical driving parameter and the driving parameter offset.

10. The terminal device according to claim 6, wherein the processor is further configured to:
obtain a current driving parameter of the motor vehicle;
determine whether the current driving parameter is the same as the target driving parameter; and
when the current driving parameter is different from the target driving parameter, adjust the current driving parameter to the target driving parameter.

11. A non-transitory computer readable storage medium, comprising an instruction, wherein when the instruction is run on a computer, the computer performs operations comprising:
obtaining vehicle external-environment data of a position of a motor vehicle and initial positioning precision of the motor vehicle;
determining a target driving parameter of the motor vehicle based on the vehicle external-environment data and the initial positioning precision comprising:
determining, by a terminal device, actual positioning precision of the motor vehicle based on the vehicle external-environment data and the initial positioning precision comprising:
determining, by the terminal device, whether the vehicle external-environment data comprises a preset environment characteristic, and
when the vehicle external-environment data comprises the preset environment characteristic, determining, by the terminal device, a precision offset based on the preset environment characteristic, and adding, by the terminal device, the precision offset and the initial positioning precision to obtain the actual positioning precision; or when the vehicle external-environment data does not comprise the preset environment characteristic, using, by the terminal device, the initial positioning precision as the actual positioning precision, and determining, by the terminal device, the target driving parameter of the motor vehicle based on the actual positioning precision; and controlling the motor vehicle to drive based on the target driving parameter.

12. The non-transitory computer readable storage medium of claim 11, wherein the obtaining, by the terminal device, the vehicle external-environment data of the position of the motor vehicle and the initial positioning precision of the motor vehicle comprises:

obtaining a positioning mode of the motor vehicle;

determining the initial positioning precision based on the positioning mode; and obtaining the vehicle external-environment data detected by an environment monitoring apparatus.

\* \* \* \* \*